United States Patent Office 3,190,888
Patented June 22, 1965

3,190,888
ARYLOXYALKYLPYRAZOLE
Milton Wolf, Chester, and Donald J. Flanigan, Delaware,
Pa., assignors to American Home Products Corporation,
New York, N.Y., a corporation of Delaware
No Drawing. Filed Aug. 22, 1963, Ser. No. 303,918
8 Claims. (Cl. 260—310)

This invention relates to new pyrazole compounds having valuable pharmacological properties. More particularly this invention relates to new aryloxyalkylpyrazoles and to the method by which such compounds may be prepared. The new compounds of the present invention are represented by the Formula I below:

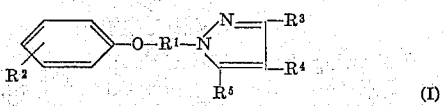
(I)

wherein $R^1$ is a divalent hydrocarbon radical having less than 8 carbon atoms in straight or branched chain configuration; $R^2$ is selected from the group consisting of hydrogen, halogen, trihaloalkyl, lower alkyl, lower alkoxy, lower alkoxyalkyl, arylalkyl, nitro, amino, dialkylamino and alkoxycarbonyl; $R^3$ and $R^5$ are selected from the group consisting of lower alkyl, halogen, lower alkoxy, lower alkoxycarbonyl, lower alkoxyalkyl, hydroxy and amino; $R^4$ is selected from the group consisting of hydrogen, halogen, lower alkyl, lower alkoxy, lower alkoxycarbonyl, lower alkoxyalkyl, hydroxy, cyano and amino.

A preferred group of compounds within the class represented by Formula I above constitutes those represented by the following structural Formula II:

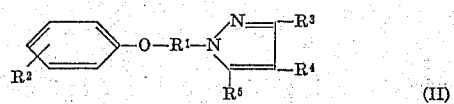
(II)

wherein $R^1$ is a divalent hydrocarbon radical having less than 8 carbon atoms; $R^2$ is selected from the group consisting of hydrogen, halogen, nitro, amino, lower alkyl, lower alkoxy, lower alkoxyalkyl and trihaloalkyl; $R^3$ and $R^5$ are lower alkyl; and $R^4$ is selected from the group consisting of hydrogen, halogen, lower alkyl, lower alkoxy, lower alkoxycarbonyl, amino and nitro.

As has been suggested, the new compounds of the present invention possess valuable pharmacological properties. More specifically, the new compounds of the present invention are useful as hypoglycemic agents. When used for this purpose, the new compounds may be administered in dosage amounts of from about 10 to about 100 mg./kg. either orally or parenterally in liquid or solid dosage forms. When used with such carriers, the compound will be present in the carrier in an amount of from about 0.1 to about 25% by weight. Dosage forms include injectables, elixirs, capsules, lozenges, or alternatively may include liquid vehicles such as water, propylene glycol, hydroalcohols, alkyl cellulose, such as for example methylcellulose as well as USP syrups. In addition to their utility as hypoglycemic agents, the new compounds of the present invention may also be used as anti-inflammatory agents. The new compounds also possess antiviral properties and may be used for this purpose.

The new compounds of the present invention considered in their broadest aspect may be prepared by reacting the sodium salt of a selected pyrazole under reflux with a phenoxyalkyl halide for a period of from about 1 to about 24 hours. The reaction mixture is then permitted to cool after which the precipitated sodium halide is separated by filtration and the filtrate thereafter concentrated. The residual oil remaining is then taken up in a suitable solvent, such as for example, methylene chloride, washed with water and a saturated salt solution and thereafter filtered. Preferably the oil is then filtered through anhydrous sodium sulfate or an equivalent drying agent. The clear filtrate is then concentrated and the residual oil distilled to recover the desired aryloxyalkylpyrazole compound.

Reference now to the specific examples which follow will provide a clearer understanding of the new compounds of the present invention and the manner in which the same are prepared.

Example I

Sodium (5.1 g., 0.222 gram-atom) is added to a solution of 3,5-dimethylpyrazole (19.7 g., 0.205 m.) in tetrahydrofuran (85 ml.) in a nitrogen atomosphere. After most of the sodium has reacted, the mixture is refluxed for one and one-half hours to complete the reaction. 4-phenoxybutyl chloride (37.8 g., 0.205 m.) is added dropwise with stirring to the clear refluxing solution of the sodium salt of pyrazole. Refluxing is continued overnight (ca. 16 hours). After cooling, the precipitated sodium chloride is separated by filtration and the filtrate concentrated in vacuo. The residual oil is taken up in methylene chloride, washed with water and saturated salt solution and then filtered through anhydrous sodium sulfate. The clear filtrate is concentrated in vacuo and the residual oil distilled to yield 9.1 g. (18.2%) of 3,5 - dimethyl - 1 - (4 - phenoxybutyl)pyrazole, B.P. 153–157°/0.7-0.8 mm., $n_D^{23}$ 1.5265.

Anal.—Calc'd for $C_{15}H_{20}N_2O$: C, 73.78; H, 8.26; N, 11.47. Found: C, 73.64; H, 8.38; N,11.34.

The compound may be used in the following composition:

3,5-dimethyl-1-(4-phenoxybutyl)pyrazole ___mg__ 5–100
Therapeutically administrable vehicle _____cc__ 1

Example II

In a manner similar to Example I, the sodium salt of 4-bromo-3,5-dimethylpyrazole is reacted with 3-(4-mehtylphenoxy)propyl bromide to produce 4-bromo-3,5-dimethyl-1-[3-(4-methylphenoxy)propyl]pyrazole.

Example III

Following the procedure of Example I, the sodium salt of 4-nitro-3,5-diethylpyrazole is reacted with 2-(4-methoxyphenoxy)ethyl bromide to produce 4-nitro-3,5-diethyl-1-[2-(4-methoxyphenoxy)ethyl]pyrazole.

Example IV

According to the method of previous examples, 3,4,5-trimethyl-1-[3-(3-ethoxyphenoxy)propyl]pyrazole is prepared by reacting the sodium salt of 3,4,5-trimethylpyrazole with 3-(3-ethoxyphenoxy) propyl bromide.

Example V

According to the method of the previous examples, reacting the sodium salt of 3(5)-methoxy-5(3)-methylpyrazole with 5-(3-dimethylaminophenoxy)heptyl bromide produces a mixture of 3-methoxy-5-methyl-1-[5-(3-dimethylaminophenoxy)heptyl]pyrazole and 5-methoxy-3 - methyl - 1-[5-(3-dimethylaminophenoxy)heptyl]pyrazole.

Example VI

Following the procedure of previous examples, the sodium salt of 3,5-dimethylpyrazole is reacted with 4-(4-trifluoromethylphenoxy butyl bromide to yield 3,5-dimethyl - 1-[4-(4-trifluoromethylphenoxy)butyl]pyrazole. The compound is combined with a therapeutically administrable vehicle in an amount of from 1 to 100 mg./cc. of the vehicle.

*Example VII*

In a manner similar to that of Example I, β-bromophenetole (55.7 g., 0.277 m.) is reacted with the sodium salt of 3,5-dimethylpyrazole (from 25.7 g., 0.277 m. of 3,5 - dimethylpyrazole) to yield 3,5-dimethyl-1-(2-phenoxyethyl)pyrazole, 41.6 g. (69.4%), B.P. 125–135°/0.1–0.2 mm., M. 51–52° (uncorrected).

*Anal.*—Calc'd for $C_{13}H_{16}N_2O$: C, 72.18; H, 7.46; N, 12.95. Found: C, 72.21; H, 7.49; N, 12.78.

The compound may be used in the following composition:

3,5-dimethyl-1-(2-phenoxyethyl)pyrazole _____mg__ 50
Therapeutically administrable vehicle _____cc__ 1

*Example VIII*

Following the method of the previous examples, 2-(2-carbethoxyphenoxy)ethyl bromide is reacted with the sodium salt of 4-amino-3,5-dimethylpyrazole to produce 4 - amino - 3,5 - dimethyl-1-[2-(2-carbethoxyphenoxy)ethyl]pyrazole.

*Example IX*

According to the method of Example I, 3,5-bis(methoxymethyl)1-[5-(3-ethylphenoxy)amyl]pyrazole is prepared by reacting the sodium salt of 3,5-bis(methoxymethyl)pyrazole with 5-(3-ethylphenoxy)amyl bromide.

*Example X*

According to the method of the previous examples, the sodium salt of 4-carbethoxy-3,5-dipropylpyrazole is reacted with 3-phenoxypropyl chloride to produce 4-carbethoxy-3,5-dipropyl-1-(3-phenoxypropyl)pyrazole.

*Example XI*

Following the method previously described, 3,5-dimethyl-1-(3-phenoxyisobutyl)pyrazole is prepared by reacting the sodium salt of 3,5-dimethylpyrazole with 3-phenoxyisobutyl bromide.

The compound may be used in the following composition:

3,5-dimethyl-1-(3-phenoxyisobutyl)pyrazole __mg__ 5–100
Propylene glycol _____cc__ 1

*Example XII*

Following the method previously described, 3,5-dimethyl - 1 - [2-(4-carbomethoxyphenoxy)ethyl]pyrazole is prepared by reacting 2-(4-carbomethoxyphenoxy)ethyl chloride with the sodium salt of 3,5-dimethylpyrazole.

*Example XIII*

According to the method of Example I, the sodium salt of 4-chloro-3,5-dimethylpyrazole is reacted with 3-(4-trifluoromethylphenoxy)propyl bromide to produce 4-chloro - 3,5 - dimethyl-1-[3-(4-trifluoromethylphenoxy)propyl]pyrazole.

*Example XIV*

In a manner similar to that of Example I, 3-phenoxypropyl bromide is reacted with the sodium salt of 3,5-dimethylpyrazole to yield 3,5-dimethyl-1-(3-phenoxypropyl)pyrazole, B.P. 115–125°/0.2–0.3 mm. $n_D^{23}$ 1.5377.

*Anal.*—Calc'd for $C_{14}H_{18}N_2O$: C, 73.00; H, 7.88; N, 12.17. Found: C, 72.74; H, 7.70; N, 12.32.

The compound may be used in the following composition:

3,5-dimethyl-1-(3-phenoxypropyl)pyrazole ____mg__ 10
Ethanol _____cc__ 1

*Example XV*

Following the method disclosed in previous examples, reacting the potassium salt of 3(5)-methyoxymethyl-5(3)-methylpyrazole with 2-phenoxyisopropyl chloride produces a mixture of 3 - methoxymethyl-5-methyl-1-(2-phenoxyisopropyl)pyrazole and 5-methoxymethyl-3-methyl-1-(2-phenoxyisopropyl)pyrazole.

*Example XVI*

According to the method of the previous examples, 3,5-dipropyl-1-(5-phenoxyamyl)pyrazole is prepared by reacting the sodium salt of 3,5-dipropylpyrazole with 5-phenoxyamyl bromide.

The compound may be used in the following composition:

3,5-dipropyl-1-(5-phenoxyamyl)pyrazole _____mg__ 25
Glycerin (50%) in water _____cc__ 1

*Example XVII*

According to the method of the previous examples, 3,5-dimethyl-1-[2-(2-nitrophenoxy)ethyl]pyrazole is prepared by reacting the sodium salt of 3,5-dimethylpyrazole with 2-(2-nitrophenoxy)ethyl bromide.

*Example XVIII*

Following the method of the previous examples, reacting 3-(2-chlorophenoxy)propyl bromide with the sodium salt of 3(5)-methyl-5(3)-ethylpyrazole results in a mixture of 3-methyl-5-ethyl-1-[3-(2-chlorophenoxy)propyl]pyrazole and 5-methyl-3-ethyl-1-[3-(2-chlorophenoxy)propyl]pyrazole.

While the compositions of the present invention and the manner in which they are administered have been described with some degree of particularity, it is to be understood that the invention is not to be limited to the compositions or method specifically disclosed and described. The invention is to be limited only as required by law in accordance with the claims attached hereto.

The invention claimed is:

1. A compound selected from the group represented by the formula:

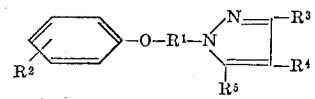

wherein $R^1$ is alkylene of 2 to 7 carbon atoms; $R^2$ is selected from the group consisting of hydrogen, halogen, nitro, amino, lower alkyl, lower alkoxy, lower alkoxyalkyl and trihaloalkyl; $R^3$ and $R^5$ are lower alkyl; and $R^4$ is selected from the group consisting of hydrogen, halogen, lower alkyl, lower alkoxy, lower alkoxycarbonyl amino and nitro.

2. 3,5-dimethyl-1-(4-phenoxybutyl)pyrazole.
3. 3,5-dimethyl-1-[4-(4-trifluoromethylphenoxy)butyl]pyrazole.
4. 3,5-dimethyl-1-(2-phenoxyethyl)pyrazole.
5. 3,5-dimethyl-1-(3-phenoxyisobutyl)pyrazole.
6. 3,5 - dimethyl-1-[2-(4-carbomethoxyphenoxy)ethyl]pyrazole.
7. 3,5-dimethyl-1-(3-phenoxypropyl)pyrazole.
8. 3,5-dimethyl-1-[2-(2-nitrophenoxy)ethyl]pyrazole.

References Cited by the Examiner

UNITED STATES PATENTS 3,014,916 12/61 Wright _____ 260—310
3,024,248 3/62 Werner _____ 260—319

OTHER REFERENCES

Conant et al., The Chemistry of Organic Compounds, 4th Ed.,, page 335, N. Y., Macmillan, 1952.

Crowell et al., Journ. Chem. Soc. (London) 1962, page 4146.

Reid et al., Liebigs Annalen de Chemie, vol. 631, page 188 (1960).

Sugimoto et al., Tetrahedron, vol. 11, pages 231–33 (1960).

IRVING MARCUS, *Primary Examiner.*

NICHOLAS S. RIZZO, *Examiner.*